(12) United States Patent
Gnoth (10) Patent No.: US 11,521,501 B2
(45) Date of Patent: Dec. 6, 2022

(54) METHOD, APPARATUS AND SYSTEM FOR OPERATING WAYPOINT, GROUND STATION AND COMPUTER READABLE STORAGE MEDIUM

(71) Applicant: Autel Robotics Europe GmbH, Ismaning (DE)

(72) Inventor: Marcus Gnoth, Ismaning (DE)

(73) Assignee: AUTEL EUROPE GmbH, Langen (DE)

(*) Notice: Subject to any disclaimer, the term of this patent is extended or adjusted under 35 U.S.C. 154(b) by 415 days.

(21) Appl. No.: 16/561,470

(22) Filed: Sep. 5, 2019

(65) Prior Publication Data
US 2021/0090447 A1    Mar. 25, 2021

(30) Foreign Application Priority Data

Aug. 23, 2018 (DE) .......................... 102018120675.5

(51) Int. Cl.
| | |
|---|---|
| G08G 5/00 | (2006.01) |
| B64C 39/02 | (2006.01) |
| B64F 1/36 | (2017.01) |
| G06F 3/04817 | (2022.01) |
| G06F 3/04842 | (2022.01) |
| G06F 3/0488 | (2022.01) |

(52) U.S. Cl.
CPC ......... *G08G 5/0069* (2013.01); *B64C 39/024* (2013.01); *B64F 1/36* (2013.01); *G06F 3/0488* (2013.01); *G06F 3/04817* (2013.01); *G06F 3/04842* (2013.01); *G08G 5/003* (2013.01); *G08G 5/0013* (2013.01); *B64C 2201/146* (2013.01)

(58) Field of Classification Search
CPC .................................................. G08G 5/0069
See application file for complete search history.

(56) References Cited

U.S. PATENT DOCUMENTS 9,273,969 B2 * 3/2016 Parthasarathy ....... G06F 3/0488
9,704,406 B1 * 7/2017 Young .................. G08G 5/0021
(Continued)

FOREIGN PATENT DOCUMENTS

| CN | 102566580 A | 7/2012 |
|---|---|---|
| CN | 106054917 A | 10/2016 |
| CN | 106681354 A | 5/2017 |

OTHER PUBLICATIONS

First Chinese Office Action Application No. 201910745580; dated May 27, 2020.

*Primary Examiner* — Michael A Berns (57) ABSTRACT

The present disclosure provides a method, an apparatus and a system for operating waypoint, a ground station and a computer readable storage medium. The method includes: displaying an icon of a flight manner related to the waypoint; determining, based on a first touch operation of a user on the icon of the flight manner, the flight manner related to the waypoint; and sending the flight manner to an aircraft, so that the aircraft flies based on the flight manner at the waypoint. In this way, the user can select the flight manner on the waypoint of the aircraft by himself in a touch operation manner, to facilitate control of the flight of the aircraft by the user, so as to facilitate flight control of the aircraft, thereby improving the experience of human-computer interaction.

14 Claims, 6 Drawing Sheets

(56) References Cited

U.S. PATENT DOCUMENTS

| | | | | |
|---|---|---|---|---|
| 9,918,002 B2* | 3/2018 | Kwon | .................... | B64C 39/024 |
| 10,867,520 B2* | 12/2020 | Heiberg | ................ | G08G 5/0039 |
| 11,112,796 B2* | 9/2021 | Djuric | .................... | B60W 30/00 |
| 2020/0058224 A1* | 2/2020 | Giona | .................... | G08G 5/0039 |
| 2020/0169666 A1* | 5/2020 | Gnoth | ............. | H04N 5/232933 |
| 2021/0090447 A1* | 3/2021 | Gnoth | .................... | G08G 5/003 |

* cited by examiner

METHOD, APPARATUS AND SYSTEM FOR OPERATING WAYPOINT, GROUND STATION AND COMPUTER READABLE STORAGE MEDIUM

CROSS-REFERENCE TO RELATED APPLICATION

This application claims priority of Germany Patent Application No. 102018120675.5, filed on Aug. 23, 2018, which is incorporated herein by reference in its entirety.

BACKGROUND

Technical Field

The present application relates to the field of unmanned aerial vehicle technologies, and in particular, to a method, an apparatus and a system for operating a waypoint, a ground station and a computer readable storage medium.

Related Art

An aircraft may also be referred to as an unmanned aerial vehicle (UAV) or a drone.

The aircraft is controlled by a ground station, and can fly based on information sent by the ground station. For an airline of the aircraft, the airline includes at least one waypoint. In the prior art, a user manually inputs waypoint information of each waypoint into the ground station. The waypoint information includes a flight manner. Then, the ground station generates an airline based on the waypoint information of the waypoints. Further, user equipment sends the airline to the ground station. Then, the ground station controls flight of the aircraft based on the airline.

However, in the prior art, because a user needs to manually input a flight manner on a waypoint of an aircraft, it is inconvenient for the user to control flight of the aircraft. In addition, in the existing manual input manner, the user needs to spend a relatively long time inputting the flight manner, making it disadvantageous to flight control of the aircraft, and the experience of human-computer interaction is relatively poor.

SUMMARY

The present application provides a method, an apparatus and a system for operating a waypoint, a ground station and a computer readable storage medium, for resolving the problem that it is inconvenient for a user to control flight of an aircraft and the user needs to spend a relatively long time inputting a flight manner, making it disadvantageous to flight control of the aircraft.

According to a first aspect, the present application provides a method for operating a waypoint, including:

displaying an icon of a flight manner related to the waypoint;

determining, based on a first touch operation of a user on the icon of the flight manner, the flight manner related to the waypoint; and sending the flight manner to an aircraft, so that the aircraft flies based on the flight manner at the waypoint.

Further, the displaying an icon of a flight manner related to the waypoint includes:

when a second touch operation of the user on an icon that is of the waypoint and that is displayed on a touch display screen is detected, displaying the icon of the flight manner related to the waypoint.

Further, the flight manner includes any of the following: a fly-by manner, a fly-in manner and a surrounding manner;

the fly-by manner is used to make the aircraft fly by the waypoint within a distance range of the waypoint;

the fly-in manner is used to make the aircraft fly by the waypoint within an error range; and the surrounding manner is used to make the aircraft fly around the waypoint based on a preset distance.

Further, the method further includes:

when the flight manner is the fly-by manner, determining a distance between an icon of the fly-by manner and the icon of the waypoint based on a third touch operation of the user on the icon of the fly-by manner; and determining, based on the distance between the icon of the fly-by manner and the icon of the waypoint, a distance between the aircraft and the waypoint when the aircraft passes by the waypoint.

Further, the method further includes:

displaying the distance between the aircraft and the waypoint when the aircraft passes by the waypoint.

Further, the method further includes:

when the flight manner is the fly-in manner, determining, based on a fourth touch operation of the user on an icon of the fly-in manner; a flight angle of the aircraft when the aircraft passes by the waypoint.

Further, the method further includes:

when the flight manner is the surrounding manner, determining, based on a fifth touch operation of the user on an icon of the surrounding manner, a distance between the aircraft and the waypoint when the aircraft surrounds the waypoint.

Further, the method further includes:

when the flight manner is the surrounding manner, determining, based on a sixth touch operation of the user on the icon of the surrounding manner; a number of turns by which the aircraft surrounds the waypoint.

Further, the method further includes:

when the flight manner is the surrounding manner, determining, based on a seventh touch operation of the user, a direction in which the aircraft surrounds the waypoint.

According to a second aspect, the present application provides a ground station, including a processor, a transmitter and a display, where the transmitter and the display are connected to the processor;

the display is configured to display an icon of a flight manner related to the waypoint;

the processor is configured to determine, based on a first touch operation of a user on the icon of the flight manner, the flight manner related to the waypoint; and the transmitter is configured to send the flight manner to an aircraft, so that the aircraft flies based on the flight manner at the waypoint.

Further, the display is specifically configured to:

when a second touch operation of the user on an icon that is of the waypoint and that is displayed on a touch display screen is detected, display the icon of the flight manner related to the waypoint.

Further, the flight manner includes any of the following: a fly-by manner, a fly-in manner and a surrounding manner;

the fly-by manner is used to make the aircraft fly by the waypoint within a distance range of the waypoint;

the fly-in manner is used to make the aircraft fly by the waypoint within an error range; and the surrounding manner is used to make the aircraft fly around the waypoint based on a preset distance.

Further, the processor is further configured to:

when the flight manner is the fly-by manner, determine a distance between an icon of the fly-by manner and the icon of the waypoint based on a third touch operation of the user on the icon of the fly-by manner; and determine, based on the distance between the icon of the fly-by manner and the icon of the waypoint, a distance between the aircraft and the waypoint when the aircraft passes by the waypoint.

Further, the display is further configured to:

display a distance between an icon of the aircraft and the icon of the waypoint.

Further, the processor is further configured to:

when the flight manner is the fly-in manner, determine, based on a fourth touch operation of the user on an icon of the fly-in manner; a flight angle of the aircraft when the aircraft passes by the waypoint.

Further, the processor is further configured to:

when the flight manner is the surrounding manner, determine, based on a fifth touch operation of the user on an icon of the surrounding manner, a distance between the aircraft and the waypoint when the aircraft surrounds the waypoint.

Further, the processor is further configured to:

when the flight manner is the surrounding manner, determine, based on a sixth touch operation of the user on the icon of the surrounding manner; a number of turns by which the aircraft surrounds the waypoint.

Further, the processor is further configured to:

when the flight manner is the surrounding manner, determine, based on a seventh touch operation of the user, a direction in which the aircraft surrounds the waypoint.

According to a third aspect, the present application provides an apparatus for operating a waypoint, including:

a first display module, configured to display an icon of a flight manner related to the waypoint;

a first determining module, configured to determine, based on a first touch operation of a user on the icon of the flight manner, the flight manner related to the waypoint; and a sending module, configured to send the flight manner to an aircraft, so that the aircraft flies based on the flight manner at the waypoint.

Further, the first display module is specifically configured to:

when a second touch operation of the user on an icon that is of the waypoint and that is displayed on a touch display screen is detected, display the icon of the flight manner related to the waypoint.

Further, the flight manner includes any of the following:

a fly-by manner, a fly-in manner and a surrounding manner;

the fly-by manner is used to make the aircraft fly by the waypoint within a distance range of the waypoint;

the fly-in manner is used to make the aircraft fly by the waypoint within an error range; and the surrounding manner is used to make the aircraft fly around the waypoint based on a preset distance.

Further, the apparatus further includes:

a second determining module, configured to: when the flight manner is the fly-by manner, determine a distance between an icon of the fly-by manner and the icon of the waypoint based on a third touch operation of the user on the icon of the fly-by manner; and a third determining module, configured to: determine, based on the distance between the icon of the fly-by manner and the icon of the waypoint, a distance between the aircraft and the waypoint when the aircraft passes by the waypoint.

Further, the apparatus further includes:

a second display module, configured to display the distance between the aircraft and the waypoint when the aircraft passes by the waypoint.

Further, the apparatus further includes:

a fourth determining module, configured to: when the flight manner is the fly-in manner, determine, based on a fourth touch operation of the user on an icon of the fly-in manner; a flight angle of the aircraft when the aircraft passes by the waypoint.

Further, the apparatus further includes:

a fifth determining module, configured to: when the flight manner is the surrounding manner, determine, based on a fifth touch operation of the user on an icon of the surrounding manner, a distance between the aircraft and the waypoint when the aircraft surrounds the waypoint.

Further, the apparatus further includes:

a sixth determining module, configured to: when the flight manner is the surrounding manner, determine, based on a sixth touch operation of the user on the icon of the surrounding manner; a number of turns by which the aircraft surrounds the waypoint.

Further, the apparatus further includes:

a seventh determining module, configured to: when the flight manner is the surrounding manner, determine, based on a seventh touch operation of the user, a direction in which the aircraft surrounds the waypoint.

According to a fourth aspect, the present application provides a system for operating a waypoint, where the operating system includes an aircraft and the ground station according to any of the second aspect.

According to a fifth aspect, the present application provides a ground station, including units or means for performing steps in any method of the foregoing first aspect.

According to a sixth aspect, the present application provides a ground station, including at least one processing element or chip for performing any method of the foregoing first aspect.

According to a seventh aspect, the present application provides a program, and when the program is executed by a processor, the program is configured to perform any method of the foregoing first aspect.

According to an eighth aspect, the present application provides a computer readable storage medium, including the program of the seventh aspect.

The technical effects of the present application are: an icon of a flight manner related to the waypoint is displayed, the flight manner related to the waypoint is determined based on a first touch operation of a user on the icon of the flight manner, and the flight manner is sent to an aircraft, so that the aircraft flies based on the flight manner at the waypoint. In this way, the user can select the flight manner on the waypoint of the aircraft by himself in a touch operation manner, to facilitate control of the flight of the aircraft by the user, so as to facilitate flight control of the aircraft, thereby improving the experience of human-computer interaction.

DETAILED DESCRIPTION

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present application. On the contrary, the implementations are merely examples of apparatuses and methods that are described in detail in the appended claims and that are consistent with some aspects of the present application.

The embodiments of the present application are applied to UAVs or aircrafts that may appear in the future. UAVs may include rotor UAVs, fixed-wing UAVs and the like. Some of the terms in the present application are explained and described below, to facilitate understanding of a person skilled in the art. It should be noted that when the solutions of the embodiments of the present application are applied to UAVs or aircrafts that may appear in the future, names of the ground station, the aircraft, the UAV, the flight controller and the task controller may change, but this does not affect implementation of the solutions of the embodiments of the present application.

The technical solutions of the embodiments of the present application are described below with reference to the accompanying drawings.

First, technical nouns involved in the present application are explained.

1) A ground station may also be referred to as a ground control device or a remote controller. The ground station may send information and a control command to a UAV, or receive information such as flight data and images fed back by the UAV, or the like. The ground station may include a remote control, a user terminal or a device integrated with functions of the remote control and the user terminal. An application program related to a UAV may be installed in the user terminal. The user terminal can implement a connection to a remote control of the UAV by running the application program. In addition, the user terminal can send a control instruction to the UAV by using the remote control, or receive images, flight data and the like fed back by the UAV. In addition, the user terminal can display the images or the fight data. Alternatively, the user terminal can implement direct communication with the UAV.

2) "A plurality of" refers to two or more, and other quantifies have similar cases.

It should be noted that the nouns or terms involved in the embodiments of the present application may be referred to by each other, and details are not described again.

Figure 1:
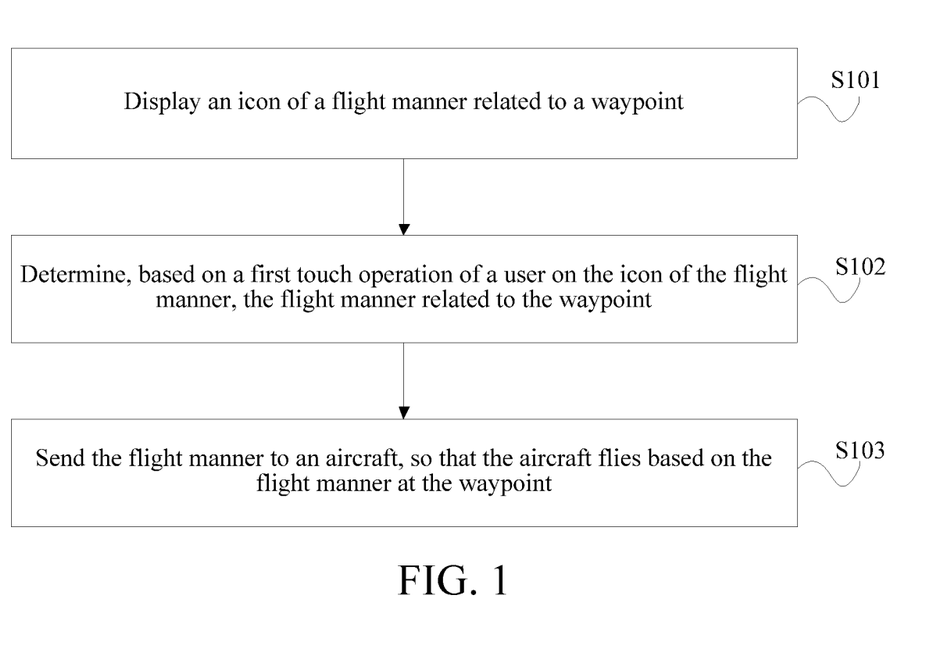
FIG. 1 is a schematic flowchart of a method for operating a waypoint according to an embodiment of the present application.

Because of advantages such as a relatively small volume, a UAV can enter a lot of areas to complete aerial photography, news reporting, surveying and mapping and the like. A user manually inputs waypoint information of each waypoint into the ground station. The waypoint information includes a flight manner. Then, the ground station generates an airline based on the waypoint information of the waypoints. Further, user equipment sends the airline to the ground station. Then, the ground station controls flight of the aircraft based on the airline. However, because a user needs to manually input a flight manner on a waypoint of an aircraft, it is inconvenient for the user to control flight of the aircraft. In addition, in the existing manual input manner, the user needs to spend a relatively long time inputting the flight manner, making it disadvantageous to flight control of the aircraft, and the experience of human-computer interaction is relatively poor. FIG. 1 is a schematic flowchart of a method for operating a waypoint according to an embodiment of the present application. As shown in FIG. 1, the method may be applied to a ground station, and includes:

S101: Display an icon of a flight manner related to the waypoint.

For example, the ground station stores airline information of an aircraft, and the airline information includes at least one waypoint. The ground station can display the waypoint, and can display the icon of the flight manner related to the waypoint. The flight manner related to the waypoint may refer to a flight manner that the aircraft can execute under the waypoint. Flight manners related to various waypoints may be the same, or may be different. This is not limited therein. For example, subject to the effect of an environment in which the waypoint is located, the aircraft can implement flight in a flight manner at one waypoint, but cannot implement flight in the flight manner at another waypoint. It may be understood that the flight manner is related to the waypoint.

An icon of a flight manner is used to identify the flight manner. That is, based on an icon of a flight manner, a user can determine the flight manner corresponding to the icon, thereby performing a selection operation.

Optionally, a display location of the icon of the flight manner is related to a display location of the waypoint. For example, the icon of the flight manner related to the waypoint is displayed near the waypoint, to indicate an association between the waypoint and the flight manner.

Figure 2:
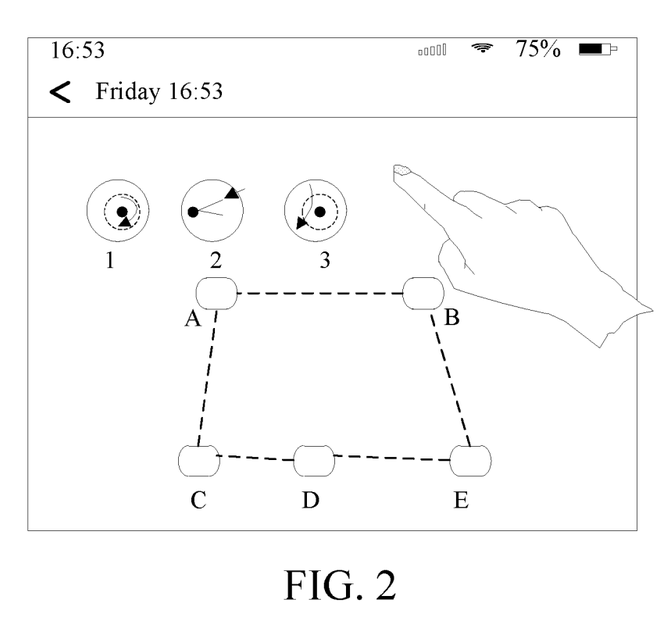
FIG. 2 is a schematic diagram 1 of a display interface of a ground station of operating a waypoint according to an embodiment of the present application.

For example, FIG. 2 is a schematic diagram 1 of an interface of a method for operating a waypoint according to an embodiment of the present application. As shown in FIG. 2, the ground station displays airline information, on which there is a waypoint A, a waypoint B, a waypoint C, a waypoint D and a waypoint E. The ground station can display icons of three flight manners related to the waypoint A, and the icons are respectively an icon 1, an icon 2 and an icon 3. The icon 1 represents a surrounding manner. The icon 2 represents a fly-in manner. The icon 3 represents a fly-by manner.

S102: Determine, based on a first touch operation of a user on the icon of the flight manner, the flight manner related to the waypoint.

Optionally, the flight manner includes any of the following: a fly-by manner, a fly-in manner, a surrounding manner and the like.

The fly-by manner is used to make the aircraft fly by the waypoint within a distance range of the waypoint.

The fly-in manner is used to make the aircraft fly by the waypoint within an error range.

The surrounding manner is used to make the aircraft fly around the waypoint based on a preset distance.

For example, the ground station may be provided with a touchscreen as an input apparatus, or the ground station may be provided with a touch display screen as an input/output apparatus. In this way, the ground station can receive a touch operation of a user by using the touchscreen or the touch display screen.

The first touch operation of the user is used to select a flight manner related to the waypoint. Specifically, the ground station may determine, based on an operating coordinate of the touch operation and a display location of the icon of the flight manner, the icon selected by the user, so as to determine the flight manner related to the waypoint. Alternatively, the ground station may determine, based on a correspondence between an operating track of the touch operation and the icon, the icon selected by the user, so as to determine the flight manner related to the waypoint.

The flight manner includes any of the following: a fly-by manner, a fly-in manner and a surrounding manner. The fly-by manner refers to that the aircraft flies by the waypoint, and there may be a distance between the aircraft and the waypoint, that is, the preset may be preset. The fly-in manner refers to that the aircraft flies by the waypoint, where the aircraft may fly by the waypoint within an error range. The surrounding manner refers to that the aircraft flies around the waypoint, where there may be a distance between the aircraft and the waypoint in a process of flying around the waypoint. Herein, the surrounding shape of the surrounding manner is not limited in this embodiment of the present application.

S103: Send the flight manner to an aircraft, so that the aircraft flies based on the flight manner at the waypoint.

For example, the ground station sends the flight manner related to the waypoint to the aircraft. After receiving the flight manner related to the waypoint, the aircraft flies on the waypoint based on the flight manner.

For example, in the example shown in FIG. 2, the ground station may select the surrounding manner, so that the ground station determines that the aircraft flies on the waypoint A in the surrounding manner; the ground station sends the surrounding manner of the waypoint A to the aircraft, so that the aircraft flies on the waypoint A in the surrounding manner.

Figure 3:
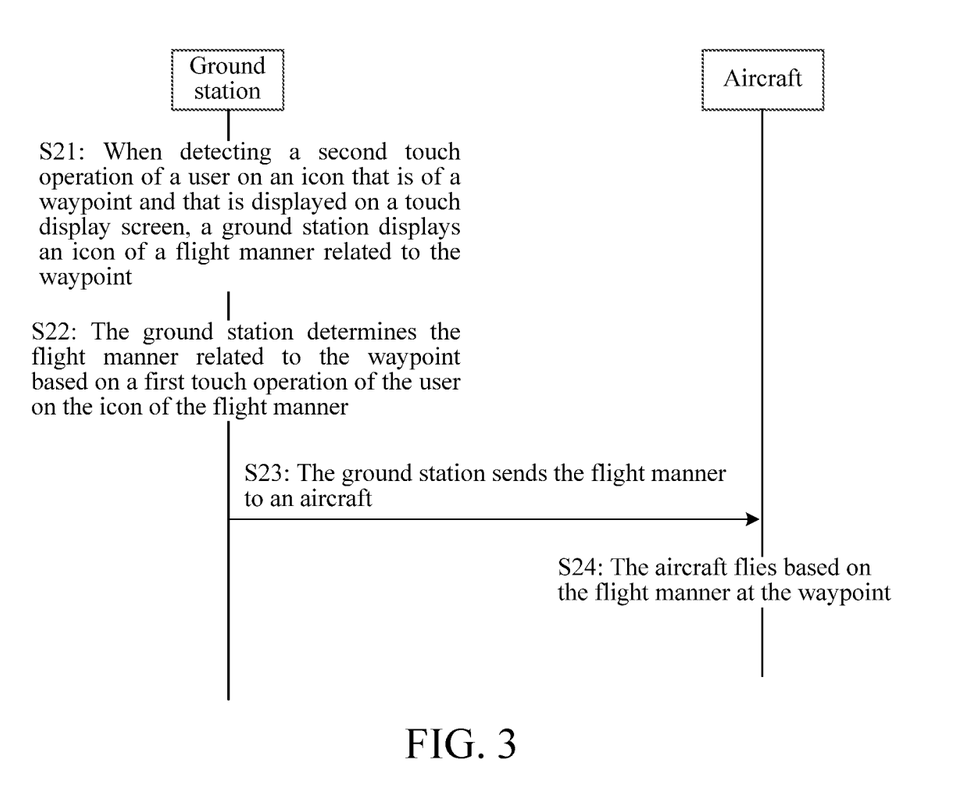
FIG. 3 is a schematic flowchart of another method for operating a waypoint according to an embodiment of the present application.

FIG. 3 is a schematic flowchart of another method for operating a waypoint according to an embodiment of the present application. As shown in FIG. 3, the method includes:

S21: When detecting a second touch operation of a user on an icon that is of the waypoint and that is displayed on a touch display screen, a ground station displays an icon of a flight manner related to the waypoint.

For example, when displaying the waypoint, the ground station may display the icon of the flight manner related to each waypoint. For example, when flight manners related to the waypoints are the same, the waypoints and the icons of the flight manners can be simultaneously displayed. Optionally, performing a touch operation on an icon of a flight manner by the user indicates that the user selects the flight manner. That is, the aircraft flies at each waypoint based on the flight manner.

Alternatively, the ground station displays only a waypoint, for example, an icon of the waypoint. When detecting the second touch operation of the user on the icon that is of the waypoint and that is displayed on a touch display screen, the ground station may display the icon of the flight manner related to the waypoint. In this way, the user can intuitively observe the flight manner related to the waypoint, thereby performing selection and improving user experience.

S22: The ground station determines the flight manner related to the waypoint based on a first touch operation of the user on the icon of the flight manner.

For example, for this step, refer to step S102 of FIG. 1, and details are not described again.

S23: The ground station sends the flight manner to an aircraft.

S24: The aircraft flies based on the flight manner at the waypoint.

For example, for this step, refer to step S103 of FIG. 1, and details are not described again.

Optionally, when selecting a flight manner of a waypoint, or after selecting a flight manner of a waypoint, the user may determine a flight parameter corresponding to flight manner.

For example, when the flight manner is the fly-by manner, the ground station determines a distance between the icon of the fly-by manner and the icon of the waypoint based on a third touch operation of the user on the icon of the fly-by manner, and determines, based on the distance between the icon of the fly-by manner and the icon of the waypoint, a distance between the aircraft and the waypoint when the aircraft passes by the waypoint.

When determining that the flight manner is the fly-by manner based on the first touch operation of the user, the ground station may further determine the distance between the icon of the fly-by manner and the icon of the waypoint based on the first touch operation, thereby determining the distance between the aircraft and the waypoint when the aircraft flies by the waypoint. In this case, the third touch operation is the first touch operation.

In an implementation, when detecting that a coordinate of a start touch point of the first touch operation of the user is within a display area of the icon of the fly-by manner, the ground station can determine that the flight manner selected by the user is the fly-by manner. The ground station further detects an operating track of the first touch operation. For example, the first touch operation is a sliding operation, and the icon of the fly-by manner can change the display location along the operating track of the first touch operation. A final display location of the icon of the fly-by manner is determined by a coordinate of an end touch point of the operating track of the first touch operation. Further, the ground station may determine the distance between the icon of the fly-by manner and the icon of the waypoint, and may determine, based on a ratio of a current display view to a corresponding environment, the distance between the aircraft and the waypoint when the aircraft flies by the waypoint.

Alternatively, after determining that the flight manner is the fly-by manner based on the first touch operation of the user, the ground station may further determine the distance between the icon of the fly-by manner and the icon of the waypoint based on another touch operation of the user, thereby determining the distance between the aircraft and the waypoint when the aircraft flies by the waypoint.

Figure 4:
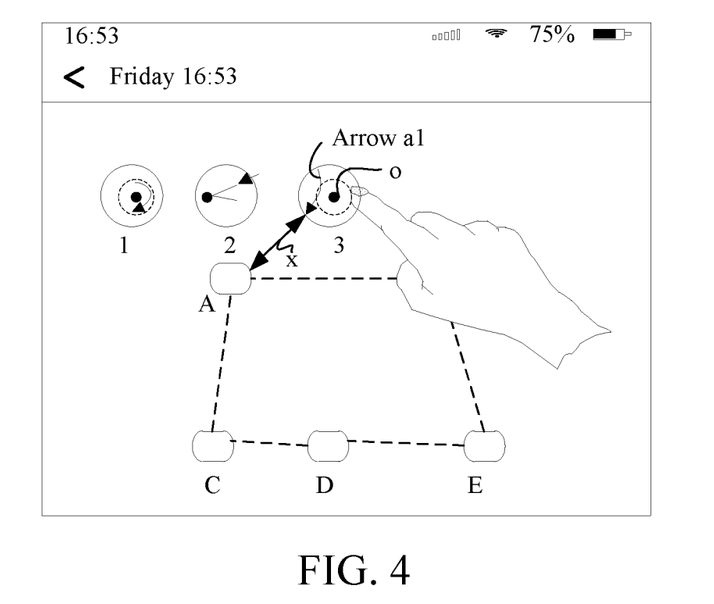
FIG. 4 is a schematic diagram 2 of a display interface of a ground station of a method for operating a waypoint according to an embodiment of the present application.

For example, referring to FIG. 4, FIG. 4 is a schematic diagram 2 of an interface of a method for operating a waypoint according to an embodiment of the present application. As shown in FIG. 4, on the interface, the ground station displays icons of various waypoints and icons of flight manners related to a waypoint A. For example, the icon 1 represents the surrounding manner, the icon 2 represents the fly-in manner, and the icon 3 represents the fly-by manner. The ground station receives the first touch operation of the user on the icon 3, and can determine that the flight manner, selected by the user, of the waypoint A is the fly-by manner. Further, the user may drag the icon 3 on the interface to adjust distance between the icon of the waypoint A and the icon 3. When the touch operation of the user ends, a distance x between the icon 3 and the waypoint A can be determined, so that the ground station can determine, based on the distance x, the distance between the aircraft and the waypoint A when the aircraft flies by the waypoint A. Further, when the user drags the icon 3 on the interface, based on the distance between the icon of the waypoint A and the icon 3 of the fly-by manner, a real distance in an environment corresponding to the distance can be displayed in real time, so that the user can determine the final location of the icon 3 based on the displayed actual distance, thereby simplifying the operation of the user of setting a flight parameter of the fly-by manner.

Alternatively, as shown in FIG. 4, when receiving the first touch operation of the user on the icon 3, the ground station can determine that the flight manner, selected by the user, of the waypoint A is the fly-by manner. In this case, the icon 3 is in an editable state, and the user can adjust a display location of an arrow a1, thereby adjusting a distance between the arrow a1 and a dot o in the icon 3. The dot o represents the waypoint A. After determining the distance between the arrow a1 and the dot o, the ground station can determine the distance between the aircraft and the waypoint A when the aircraft flies by the waypoint A in actual flight.

For another example, when the flight manner is the fly-in manner, the ground station determines, based on a fourth touch operation of the user on an icon of the fly-in manner, a flight angle of the aircraft when the aircraft passes by the waypoint.

When determining that the flight manner is the fly-in manner based on the first touch operation of the user, the ground station may further determine, based on the first touch operation, a flight angle of the aircraft when the aircraft passes by the waypoint. In this case, the third touch operation is the first touch operation.

In an implementation, when detecting that a coordinate of a start touch point of the first touch operation of the user is within a display area of the icon of the fly-in manner, the ground station can determine that the flight manner selected by the user is the fly-in manner. The ground station further detects an end touch point of the first touch operation, and determines, based on an angle between a line connecting the end touch point and the waypoint A and a horizontal line or a vertical line, a flight angle of the aircraft when the aircraft passes by the waypoint. Herein, the flight angle of the aircraft when the aircraft passes by the waypoint may be understood as an angle between a flight track of the aircraft and a horizontal plane or vertical plane, or the flight angle may be understood as an angle between the flight track of the aircraft and a base line of the flight track in a same plane.

Alternatively, after determining that the flight manner is the fly-in manner based on the first touch operation of the user, the ground station may further determine, based on another touch operation of the user, a flight angle of the aircraft when the aircraft passes by the waypoint.

Figure 5:
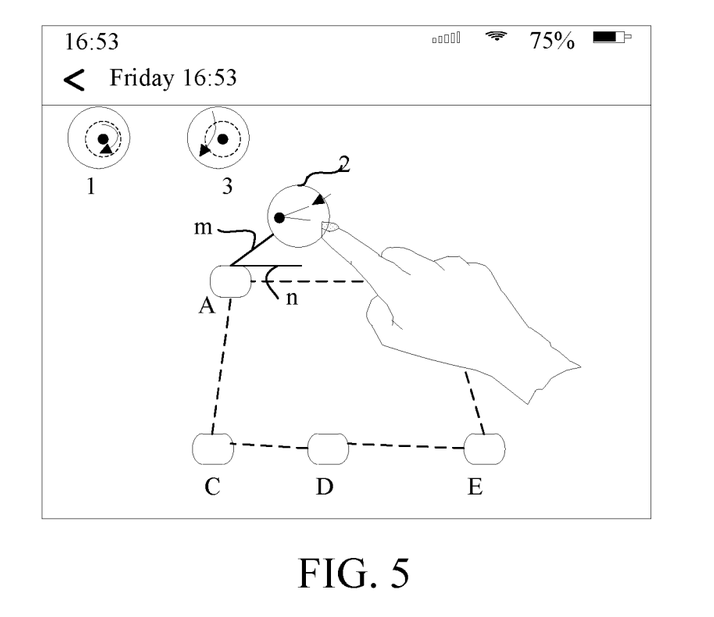
FIG. 5 is a schematic diagram 3 of a display interface of a ground station of a method for operating a waypoint according to an embodiment of the present application.

For example, referring to FIG. 5, FIG. 5 is a schematic diagram 3 of an interface of a method for operating a waypoint according to an embodiment of the present application. As shown in FIG. 5, on the interface, the ground station displays icons of various waypoints and icons of flight manners related to a waypoint A. For example, the icon 1 represents the surrounding manner, the icon 2 represents the fly-in manner, and the icon 3 represents the fly-by manner. The ground station receives the first touch operation of the user on the icon 2, and can determine that the flight manner, selected by the user, of the waypoint A is the fly-in manner. Further, the user may drag the icon 2 on the interface to adjust an angle between a line m connecting the icon 2 and the waypoint A and a horizontal line n. The horizontal line n may be used to represent a reference plane (such as a horizontal plane or a vertical plane) in an actual environment or the foregoing base line. Further, when the user drags the icon 2, the angle between the connection line m and the horizontal line n can be displayed in real time, to indicate the flight angle of the aircraft when the aircraft passes by the waypoint in the actual environment, so that the user can accurately set the flight angle based on a displayed angle value. In this way, the process of the user of setting a flight parameter related to the fly-in manner can be simplified, thereby improving user experience.

Alternatively, as shown in FIG. 5, the ground station can determine that the flight manner, selected by the user, of the waypoint A is the fly-in manner based on the first touch operation of the user on the icon 3. In this case, the icon 3 is in an editable state, so that the user can set, by adjusting the size of the angle in the icon 3, the flight angle of the aircraft when the aircraft passes by the waypoint A.

For another example, when the flight manner is the surrounding manner, the ground station determines, based on a fifth touch operation of the user on an icon of the surrounding manner; a distance between the aircraft and the waypoint when the aircraft surrounds the waypoint. Alternatively, the ground station determines, based on a sixth touch operation of the user on the icon of the surrounding manner, the number of turns by which the aircraft surrounds the waypoint. Alternatively, the ground station determines, based on a seventh touch operation of the user, a direction in which the aircraft surrounds the waypoint. Alternatively, the ground station determines, based on a touch operation of the user, a surrounding shape and the like of surrounding, by the aircraft, the waypoint.

When determining that the flight manner is the surrounding manner based on the first touch operation of the user, the ground station can further determine, based on the first touch operation, the distance between the aircraft and the waypoint when the aircraft surrounds the waypoint, or determine the number of turns by which the aircraft surrounds the waypoint, the direction in which the aircraft surrounds the waypoint, the shape of surrounding, by the aircraft, the waypoint and the like. In this case, the fifth touch operation, the sixth touch operation and the seventh touch operation are the first touch operation.

In an implementation, when detecting that a coordinate of a start touch point of the first touch operation of the user is within a display area of the icon of the surrounding manner, the ground station can determine that the flight manner selected by the user is the surrounding manner. If determining that the surrounding shape in the surrounding manner is a fixed shape such as a circle, the ground station may can further detect a distance between an end touch point of the first touch operation and the waypoint A, and determine, based on the distance, a distance between the aircraft and the waypoint when the aircraft surrounds the waypoint A. The distance may be used as a surrounding radius value when the aircraft surrounds the waypoint A in a circular shape. If it is determined that the surrounding shape in the surrounding manner is not fixed, a distance between each touch point in an operating track of the first touch operation and the waypoint may be detected, and the distance between the aircraft and the waypoint when the aircraft surrounds the waypoint is determined based on a correspondence between locations of icons of the touch points and the waypoint and locations of the actual aircraft and the waypoint. Further, the ground station may determine, based on the number of turns formed by the operating track of the first touch operation, the direction of the operating track and the shape of the operating track, the number of the turns of surrounding, the surrounding direction, the surrounding shape and the like when the aircraft flies around the waypoint A.

Alternatively, after determining that the flight manner is the surrounding manner based on the first touch operation of the user, the ground station can further determine, based on another touch operation of the user, the distance between the aircraft and the waypoint when the aircraft surrounds the waypoint, and determine flight parameters such as the number of turns of surrounding, the surrounding direction and the surrounding shape.

Figure 6:
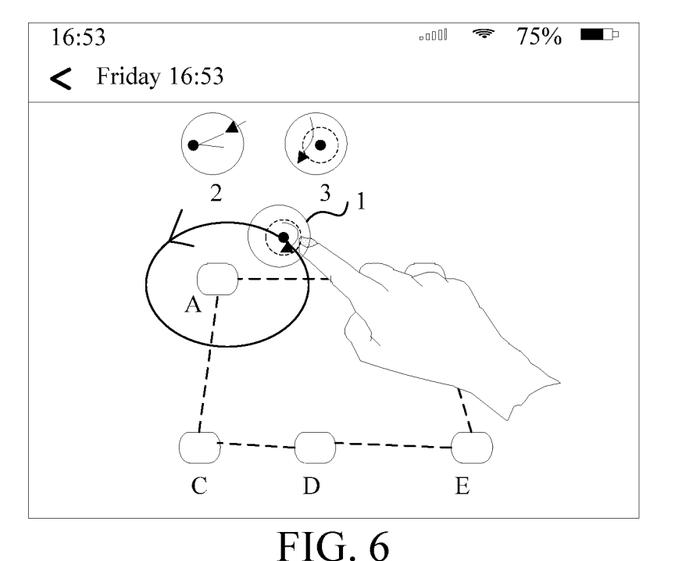
FIG. 6 is a schematic diagram 4 of a display interface of a ground station of a method for operating a waypoint according to an embodiment of the present application.

For example, as shown in FIG. 6, FIG. 6 is a schematic diagram 4 of a cross section of a method for operating a waypoint according to an embodiment of the present application. As shown in FIG. 6, on the interface, the ground station displays icons of various waypoints and icons of flight manners related to a waypoint A. For example, the icon 1 represents the surrounding manner, the icon 2 represents the fly-in manner, and the icon 3 represents the fly-by manner. The ground station receives the first touch operation of the user on the icon 1, and can determine that the flight manner, selected by the user, of the waypoint A is the surrounding manner. Further, the user can drag the icon 1 on the interface, and surrounds the icon of the waypoint A. The ground station can determine, based on the distance between the icon 1 and the icon of the waypoint A, a distance between the aircraft and the waypoint A when the aircraft surrounds the waypoint A in actual flight. Further, the ground station can also determine the surrounding direction, the surrounding shape and the like based on the dragging direction, the dragging shape, and the like of the user on the icon 1. For example, as shown in FIG. 6, the user drags the icon 1 in an anticlockwise manner, so that the icon 1 performs anticlockwise movement around the icon the waypoint A. In this way, the ground station can determine that the surrounding direction when the aircraft surrounds the waypoint A is anticlockwise.

In this embodiment, an icon of a flight manner related to the waypoint is displayed, the flight manner related to the waypoint is determined based on a first touch operation of a user on the icon of the flight manner, and the flight manner is sent to an aircraft, so that the aircraft flies based on the flight manner at the waypoint. In addition, the user can perform human-computer interaction with the ground station, and adjust a specific flight manner of the aircraft on the waypoint. For example, the distance between the aircraft and the waypoint when the aircraft passes by the waypoint is adjusted, the flight angle of the aircraft when the aircraft passes by the waypoint is adjusted or the like. In this way, the user can select the flight manner on the waypoint of the aircraft by himself in a touch operation manner, to facilitate control of the flight of the aircraft by the user, so as to facilitate flight control of the aircraft, thereby improving the experience of human-computer interaction.

Figure 7:
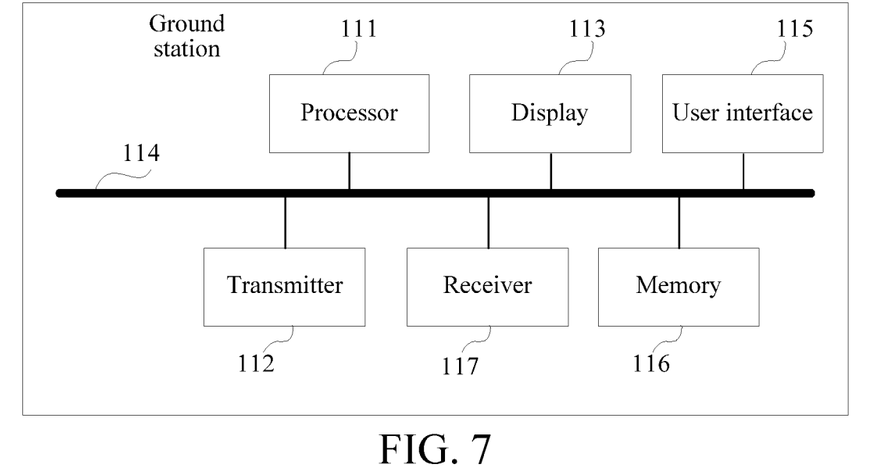
FIG. 7 is a schematic structural diagram of a ground station according to an embodiment of the present application.

FIG. 7 is a schematic structural diagram of a ground station according to an embodiment of the present application. As shown in FIG. 7, the ground station includes a processor 111, a transmitter 112 and a display 113.

The transmitter 112 and the display 113 are connected to the processor 111.

The display 113 is configured to display an icon of a flight manner related to the waypoint.

The processor 111 is configured to determine, based on a first touch operation of a user on the icon of the flight manner, the flight manner related to the waypoint.

The transmitter 112 is configured to send the flight manner to an aircraft, so that the aircraft flies based on the flight manner at the waypoint.

The display 113 is specifically configured to:

when a second touch operation of the user on an icon that is of the waypoint and that is displayed on a touch display screen is detected, display the icon of the flight manner related to the waypoint.

The flight manner includes any of the following: a fly-by manner, a fly-in manner and a surrounding manner. The fly-by manner is used to make the aircraft fly by the waypoint within a distance range of the waypoint. The fly-in manner is used to make the aircraft fly by the waypoint within an error range. The surrounding manner is used to make the aircraft fly around the waypoint based on a preset distance.

The processor 111 is further configured to:

when the flight manner is the fly-by manner, determine a distance between an icon of the fly-by manner and the icon of the waypoint based on a third touch operation of the user on the icon of the fly-by manner; and determine, based on the distance between the icon of the fly-by manner and the icon of the waypoint, a distance between the aircraft and the waypoint when the aircraft passes by the waypoint.

The display 113 is further configured to display the distance between the aircraft and the waypoint when the aircraft passes by the waypoint.

The processor 111 is further configured to: when the flight manner is the fly-in manner, determine, based on a fourth touch operation of the user on an icon of the fly-in manner; a flight angle of the aircraft when the aircraft passes by the waypoint.

The processor 111 is further configured to: when the flight manner is the surrounding manner, determine, based on a fifth touch operation of the user on an icon of the surrounding manner, a distance between the aircraft and the waypoint when the aircraft surrounds the waypoint.

The processor 111 is further configured to: when the flight manner is the surrounding manner, determine, based on a sixth touch operation of the user on the icon of the surrounding manner; a number of turns by which the aircraft surrounds the waypoint.

The processor 111 is further configured to: when the flight manner is the surrounding manner, determine, based on a seventh touch operation of the user, a direction in which the aircraft surrounds the waypoint.

Optionally, the ground station may further include a bus 114. The processor 111 may be connected to the transmitter 112 by using a bus. The bus 114 may be a bus of a peripheral component interconnect (PCI) standard, a bus with an extended industry standard architecture (EISA) or the like. The bus 114 may be an address bus, a data bus, a control bus or the like. For ease of representation, only one bold line is used to represent the bus in FIG. 7, but this does not mean that there is only one bus or only one type of bus.

Optionally, the ground station may further include a user interface 115, a memory 116 and a receiver 117. The user interface 115 is configured to receive an instruction sent by a user. The memory 116 is configured to store information. The receiver 116 is configured to receive information sent by the aircraft.

In the embodiments of the present application, the foregoing embodiments may be referred to by each other, and the same or similar steps and nouns are not described one by one again.

Alternatively, some or all of the foregoing modules may be embedded in a chip of the ground station in the form of an integrated circuit for implementation. They can be implemented separately or integrated together. That is, the foregoing modules may be configured to implement one or more integrated circuits of the foregoing method, for example, one or more application specific integrated circuits (ASICs), or one or more processing units. The one or more processing units may be a general processing unit, such as central processing unit, or a dedicated processing unit, such as a digital signal processor or one or more field programmable gate arrays (FPGAs).

Reference may be made to the technical solutions of the foregoing embodiments for this embodiment, and the implementation principle and technical effects thereof are similar. Details are not described herein again.

Figure 8:
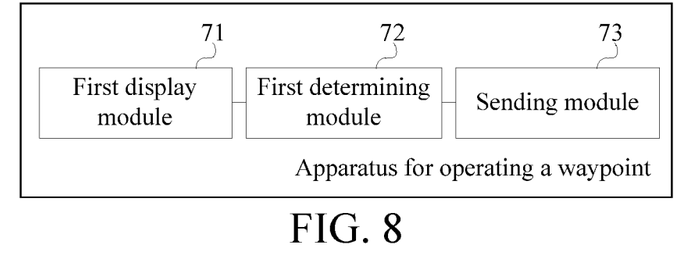
FIG. 8 is a schematic diagram of modular composition of an apparatus for operating a waypoint according to an embodiment of the present application.
Figure 9:
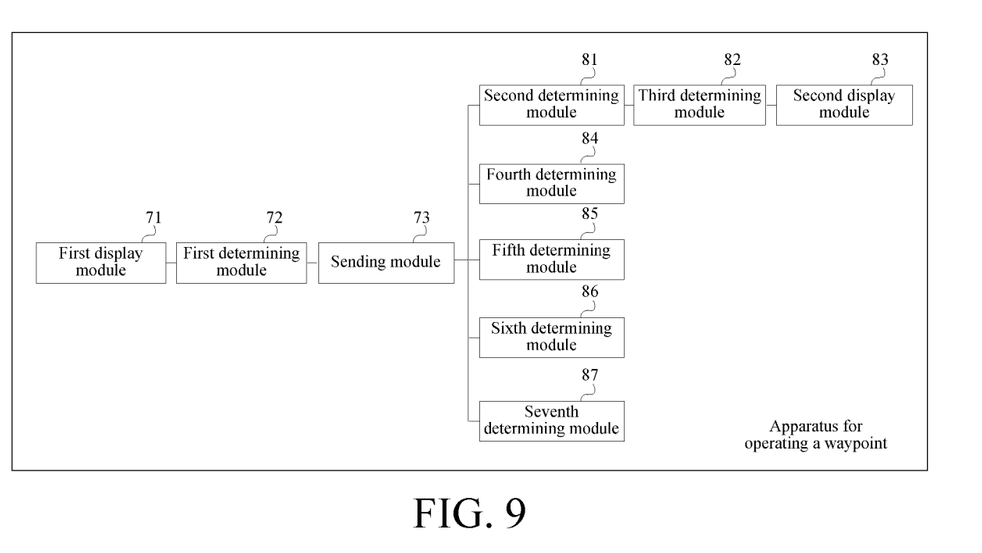
FIG. 9 is a schematic diagram of modular composition of another apparatus for operating a waypoint according to an embodiment of the present application.

FIG. 8 is a schematic structural diagram of an apparatus for operating a waypoint according to an embodiment of the present application. The apparatus for operating a waypoint may be a ground station, or integrated in the ground station as an independent apparatus. The apparatus includes:

a first display module 71, configured to display an icon of a flight manner related to the waypoint;

a first determining module 72, configured to determine, based on a first touch operation of a user on the icon of the flight manner, the flight manner related to the waypoint; and a sending module 73, configured to send the flight manner to an aircraft, so that the aircraft flies based on the flight manner at the waypoint FIG. 9 is a schematic structural diagram of another apparatus for operating a waypoint according to an embodiment of the present application. Based on the embodiment shown in FIG. 9, the apparatus for operating a waypoint is applied to a ground station. A first display module 71 is specifically configured to:

when a second touch operation of the user on an icon that is of the waypoint and that is displayed on a touch display screen is detected, display the icon of the flight manner related to the waypoint.

The flight manner includes any of the following: a fly-by manner, a fly-in manner and a surrounding manner. The fly-by manner is used to make the aircraft fly by the waypoint within a distance range of the waypoint. The fly-in manner is used to make the aircraft fly by the waypoint within an error range. The surrounding manner is used to make the aircraft fly around the waypoint based on a preset distance.

The apparatus provided in this embodiment further includes:

a second determining module 81, configured to: when the flight manner is the fly-by manner, determine a distance between an icon of the fly-by manner and the icon of the waypoint based on a third touch operation of the user on the icon of the fly-by manner; and a third determining module 82, configured to: determine, based on the distance between the icon of the fly-by manner and the icon of the waypoint, a distance between the aircraft and the waypoint when the aircraft passes by the waypoint.

The apparatus provided in this embodiment further includes:

a second display module 83, configured to display a distance between an icon of the aircraft and the icon of the waypoint.

The apparatus provided in this embodiment further includes:

a fourth determining module 84, configured to: when the flight manner is the fly-in manner, determine, based on a fourth touch operation of the user on an icon of the fly-in manner; a flight angle of the aircraft when the aircraft passes by the waypoint.

The apparatus provided in this embodiment further includes:

a fifth determining module 85, configured to: when the flight manner is the surrounding manner, determine, based on a fifth touch operation of the user on an icon of the surrounding manner, a distance between the aircraft and the waypoint when the aircraft surrounds the waypoint.

The apparatus provided in this embodiment further includes:

a sixth determining module 86, configured to: when the flight manner is the surrounding manner, determine, based on a sixth touch operation of the user on the icon of the surrounding manner; a number of turns by which the aircraft surrounds the waypoint.

The apparatus provided in this embodiment further includes:

a seventh determining module 87, configured to: when the flight manner is the surrounding manner, determine, based on a seventh touch operation of the user, a direction in which the aircraft surrounds the waypoint.

An embodiment of the present application provides a system for operating a waypoint. The system includes an aircraft and the ground station provided in the foregoing embodiments. In the foregoing embodiments, implementation may be entirely or partially performed by using software, hardware, firmware or any combination thereof. When software is used for implementation, implementation may be entirely or partially performed in the form of a computer program product. The computer program product includes one or more computer instructions. When the computer program instructions are loaded and executed on a computer, the processes or functions based on the embodiments of the present application are entirely or partially generated. The computer may be a general-purpose computer, a dedicated computer, a computer network or another programmable apparatus. The computer instructions may be stored in a computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer readable storage medium may be any available medium that can be accessed by a computer or a data storage device such as a server or a data center that includes one or more available media. The available medium may be a magnetic medium (for example, a floppy disk, a hard disk or a magnetic tape), an optical medium (for example, a DVD) or a semiconductor medium (for example, a solid state disk (SSD)).

A person skilled in the art should realize that in the foregoing one or more examples, the functions described in the embodiments of the present application may be implemented by using hardware, software, firmware or any combination thereof. When the functions are implemented by using software, the functions may be stored in a compute readable medium or used as one or more instructions or codes on the computer readable storage medium for transmission. The computer readable medium includes a computer storage medium and a communication medium. The communication medium includes any medium that facilitates transmission of a computer program from one place to another place. The storage medium may be any available medium that can be accessed by a general-purpose or dedicated computer.

What is claimed is:

1. A method for operating a waypoint, comprising: displaying an icon of a flight manner related to the waypoint;
    wherein the flight manner comprises any of the following:
        a fly-by manner, a fly-in manner and a surrounding manner;
    the fly-by manner is used to make an aircraft fly by the waypoint within a distance range of the waypoint;
    the fly-in manner is used to make the aircraft fly by the waypoint within an error range; and
    the surrounding manner is used to make the aircraft fly around the waypoint based on a preset distance;
    determining, based on a first touch operation of a user on the icon of the flight manner, the flight manner related to the waypoint; and
    sending the flight manner to the aircraft, so that the aircraft flies based on the flight manner at the waypoint;
    when the flight manner is the fly-in manner, determining, based on a fourth touch operation of the user on an icon of the fly-in manner; a flight angle of the aircraft when the aircraft passes by the waypoint.

2. The method according to claim 1, wherein the displaying the icon of the flight manner related to the waypoint comprises:
    when a second touch operation of the user on an icon that is of the waypoint and that is displayed on a touch display screen is detected, displaying the icon of the flight manner related to the waypoint.

3. The method according to claim 1, wherein the method further comprises:
    when the flight manner is the fly-by manner, determining a distance between an icon of the fly-by manner and an icon of the waypoint based on a third touch operation of the user on the icon of the fly-by manner; and
    determining, based on the distance between the icon of the fly-by manner and the icon of the waypoint, a distance between the aircraft and the waypoint when the aircraft passes by the waypoint.

4. The method according to claim 3, wherein the method further comprises:
    displaying the distance between the aircraft and the waypoint when the aircraft passes by the waypoint.

5. The method according to claim 1, wherein the method further comprises:
    when the flight manner is the surrounding manner, determining, based on a fifth touch operation of the user on an icon of the surrounding manner, a distance between the aircraft and the waypoint when the aircraft is all around the waypoint.

6. The method according to claim 1, wherein the method further comprises:
    when the flight manner is the surrounding manner, determining, based on a sixth touch operation of the user on an icon of the surrounding manner; a number of turns by which the aircraft is all around the waypoint.

7. The method according to claim 1, wherein the method further comprises:
    when the flight manner is the surrounding manner, determining, based on a seventh touch operation of the user, a direction in which the aircraft is all around the waypoint.

8. A ground station, comprising a processor, a transmitter and a display, wherein the transmitter and the display are connected to the processor;
    the display is configured to display an icon of a flight manner related to a waypoint;
    wherein the flight manner comprises any of the following:
        a fly-by manner, a fly-in manner and a surrounding manner;
    the fly-by manner is used to make an aircraft fly by the waypoint within a distance range of the waypoint;
    the fly-in manner is used to make the aircraft fly by the waypoint within an error range; and
    the surrounding manner is used to make the aircraft fly around the waypoint based on a preset distance;
    the processor is configured to determine, based on a first touch operation of a user on the icon of the flight manner, the flight manner related to the waypoint; and
    the transmitter is configured to send the flight manner to the aircraft, so that the aircraft flies based on the flight manner at the waypoint;
    when the flight manner is the fly-in manner, determine, based on a fourth touch operation of the user on an icon of the fly-in manner; a flight angle of the aircraft when the aircraft passes by the waypoint.

9. The ground station according to claim 8, wherein the display is specifically configured to:
    when a second touch operation of the user on an icon that is of the waypoint and that is displayed on a touch display screen is detected, display the icon of the flight manner related to the waypoint.

10. The ground station according to claim 8, wherein the processor is further configured to:
    when the flight manner is the fly-by manner, determine a distance between an icon of the fly-by manner and the icon of the waypoint based on a third touch operation of the user on the icon of the fly-by manner; and
    determine, based on the distance between the icon of the fly-by manner and the icon of the waypoint, a distance between the aircraft and the waypoint when the aircraft passes by the waypoint.

11. The ground station according to claim 10, wherein the display is further configured to:
    display the distance between the aircraft and the waypoint when the aircraft passes by the waypoint.

12. The ground station according to claim 8, wherein the processor is further configured to:
    when the flight manner is the surrounding manner, determine, based on a fifth touch operation of the user on an icon of the surrounding manner, a distance between the aircraft and the waypoint when the aircraft is all around the waypoint.

13. The ground station according to claim 8, wherein the processor is further configured to:
    when the flight manner is the surrounding manner, determine, based on a sixth touch operation of the user on an icon of the surrounding manner; a number of turns by which the aircraft is all around the waypoint.

14. The ground station according to claim 8, wherein the processor is further configured to:

when the flight manner is the surrounding manner, determine, based on a seventh touch operation of the user, a direction in which the aircraft is all around the waypoint.

* * * * *